UNITED STATES PATENT OFFICE.

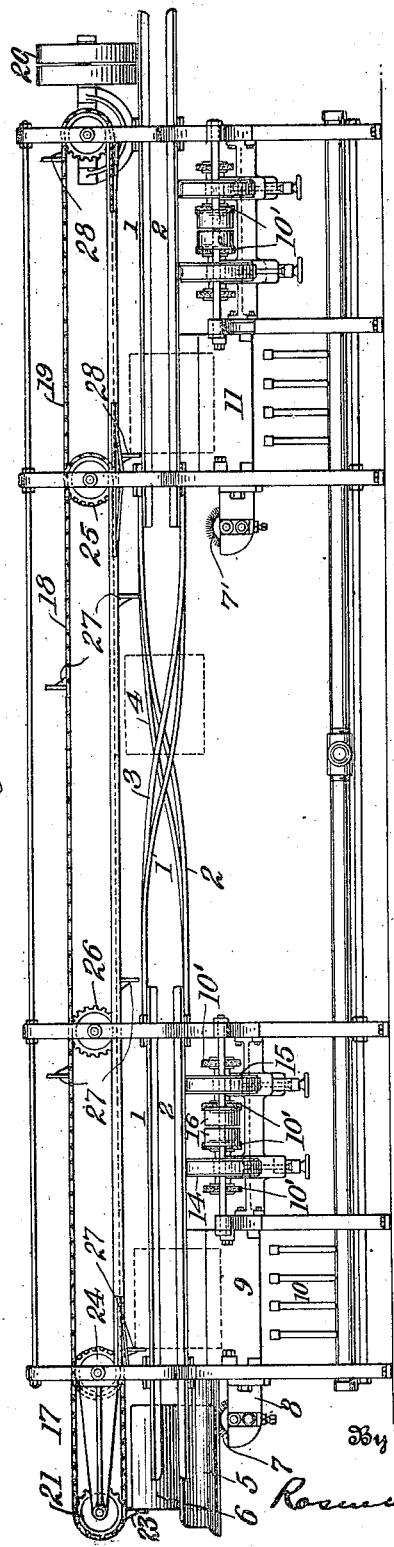

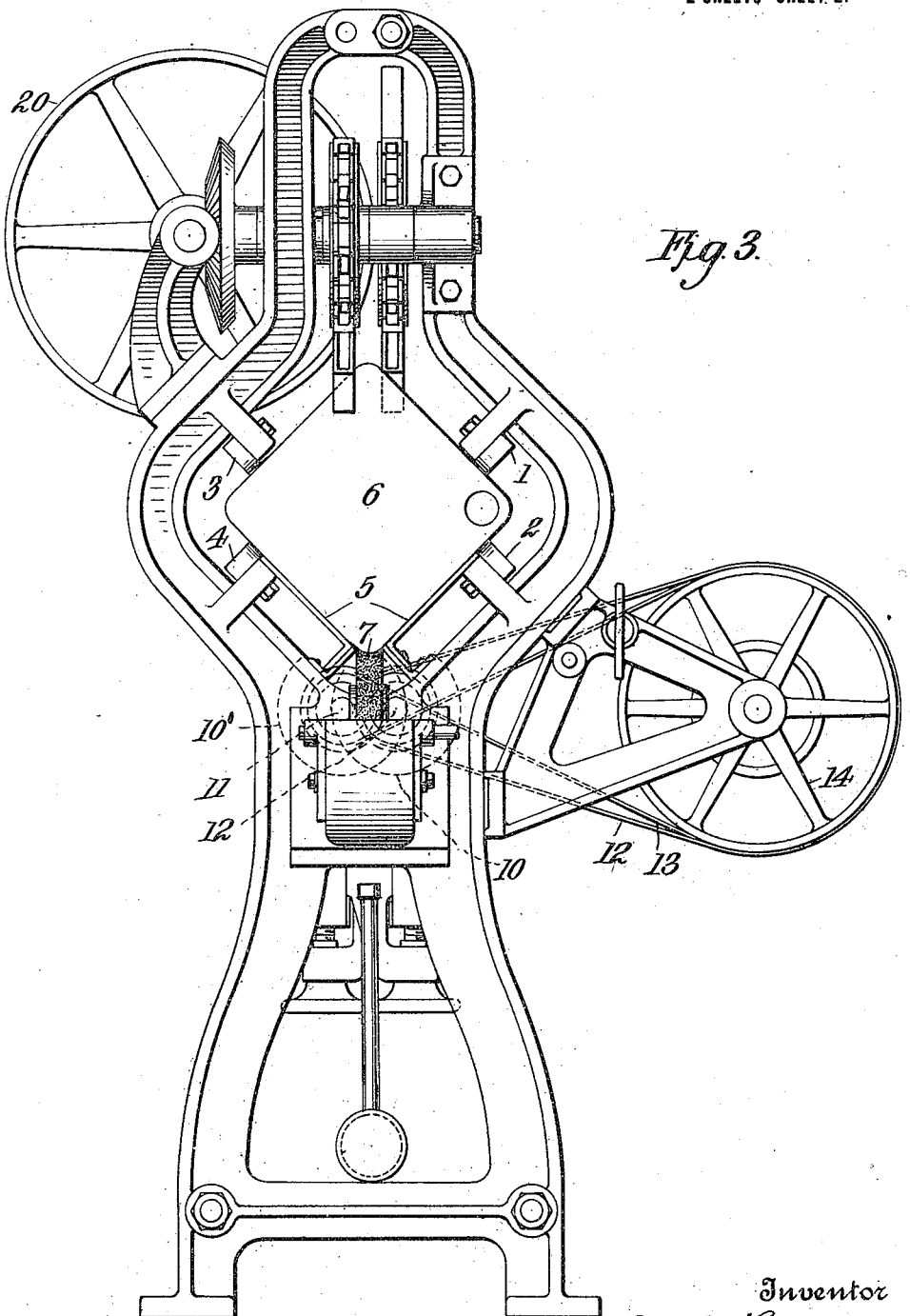

LEO J. LEFFLER, OF NEW YORK, N. Y.

CAN-SOLDERING MACHINE.

1,244,105.

Specification of Letters Patent.

Patented Oct. 23, 1917.

Application filed November 2, 1916. Serial No. 129,052.

*To all whom it may concern:*

Be it known that I, LEO J. LEFFLER, a citizen of the United States, residing at the city of New York, in the borough of Queens and State of New York, have invented certain new and useful Improvements in Can-Soldering Machines, of which the following is a full, clear, and exact description.

This invention relates to can-soldering machines, the object being to improve the structure of this kind of machine in respect to its size as well as in respect to its cost of construction and operation.

My invention particularly relates to that class of machine which is adapted to solder the side seams of rectangular cans, in which the seam of the can is immersed in a solder bath on its passage through the machine. Inasmuch as an appreciable period of time is required to obtain a proper coating of the solder upon the seam, it has been the custom heretofore to use an elongated tank containing the molten solder, through which the can has a continuous motion, the period of immersion being dependent upon the speed of travel of the can and the length of the tank. A machine of this character is necessarily of considerable size and requires a large amount of solder and a consumption of considerable heat in maintaining the solder in fused condition. In my improved machine, I reduce the size of the solder bath to approximately the length of the can and after feeding the can into the bath I allow it to dwell or remain stationary therein long enough to thoroughly coat the seam after which the travel of the can is resumed and the other necessary operations performed upon it as it passes through the machine. My invention, therefore, may be generally stated as consisting of the combination in a can-soldering machine, of a solder bath of substantially the same length as the length of the can to be acted upon, and feeding mechanism providing for a dwell of the can in the bath. The invention, however, will be specifically described and formally claimed hereinafter.

Referring to the accompanying drawings:

Figure 1 is a side elevation of a complete can-soldering machine constructed to successively solder two side seams of a rectangular can;

Fig. 2 is a plan of the can feeding belts; and

Fig. 3 is an end elevation on a large scale, of the machine, looking from the left of Fig. 1.

Many details of this machine being well known and of common use in the art, require no description.

The machine comprises a guideway along which the can travels. This guideway consists of the rails 1, 2, 3 and 4, which are arranged parallel to each other in the front and rear halves of the machine, but at the intermediate portion of the machine are spirally arranged as shown in Fig. 1, for the purpose of reversing the position of the can after one of its seams has been soldered, in order that the other seam may be acted upon before the can leaves the machine. At the left or front end of the machine is a flaring seat 5 consisting of two plates arranged with their lower edges slightly separated, as seen in Fig. 3, and diverging upward, troughlike, to receive the can, indicated at 6, which is manually or otherwise deposited thereon. Beneath this seat and projecting slightly into the space between the lower edges of the plates 5, is a rotary brush 7 mounted in an acid tank 8, the function of which is to apply an acid flux to the seam of the can which is presented through the bottom opening of the seat as the can moves into the machine. Immediately beyond the acid tank 8 is a tank 9 of solder, the contents of which is kept in fused condition by the heat from gas burners 10. This solder tank or bath is so related to the guideway that when the can reaches a position immediately above the tank its seam is slightly immersed in the molten solder. This tank, in accordance with my invention, is made of substantially the same length as that of the can to be acted upon, when considered in the direction of travel of the can. Next following the solder tank 9, there are arranged a number of buffing or cleaning wheels 10' mounted on two shafts 11 and 12, and so arranged with respect to the guide that the coated seam will be subjected to the cleaning and abrasive action of the brushes as the can moves along. The acid bath 8 and the brushes 10' are common in these machines and constitute no part of my invention. After the can leaves the cleaning brushes 10' it is reversed in position by the spiral portion of the guide and the second seam on the can is then presented to the second acid brush 7', beyond which is located another solder bath 11, similar to the bath 9, and which coöperates with the second seam of the can in exactly the same manner, and beyond this solder tank is another set of cleaning brushes 10'. The cleaning brushes are driven by belts 12 and 13, one of which is crossed so that the two shafts upon which the brushes are located will run in opposite directions. These belts pass over pulleys 14 and 15 which are driven from any source of power through the pulleys 16. For the purpose of feeding the can along the guideway, I provide three chain belts 17, 18 and 19, respectively, which pass over sprocket wheels mounted on short shafts in the upper part of the machine and driven from the pulley 20. The chain 17 runs over two sprocket wheels, one of them, 21, being located at the extreme forward end of the machine, and the other, 22, immediately above the front end of the solder tank 9. This chain is provided with one pushing finger 23, which is adapted to strike a can that has been placed upon the seat 5 and move it to a position immediately above the solder bath, as indicated by dotted lines in Fig. 1, after which, by reason of the finger 23 being carried around the sprocket wheel 22, the can is left stationary. The chain belt 18 passes over a sprocket wheel 24 on the same shaft with the wheel 22 and also over a sprocket wheel 25 mounted immediately above the front end of the second solder bath 11, this chain therefore being considerably longer than the chain 17. The chain 18 is steadied in its movement by an idler sprocket 26. This chain is provided with five pushing fingers 27, whose position thereon is such that they do not engage the can until some considerable time after the finger 23 on chain 17 has disengaged with the can and left it in the solder bath. The chain 19 is provided with two fingers 28, which are likewise so spaced thereon with respect to the position of the fingers 27 on chain 18 that after one of the latter has moved the can into position above the solder bath it remains in that position for an appreciable time before one of the fingers 28 engages and moves it out of the bath. Therefore, when a can is placed upon the seat 5 it is engaged first by the finger 23 and moved along the guide until it reaches the position shown in dotted lines immediately above the solder bath where the finger disengages with the can, leaving the latter stationary, and with its seam immersed in the solder. The can dwells or remains in this position until the next finger 27 of chain 18 passes around the sprocket 24 and strikes the front end of the can, whereupon the can resumes its travel along the guides and first passes over the cleaning brushes 10' and continues on through the spiral reversing portion of the guide where its second seam is brought to the bottom; it is then moved to the position shown in dotted lines, over the second solder bath where the finger 27 disengages with it and the can is allowed to dwell an appreciable time with its seam immersed in the solder, after which one of the fingers 28 engages the can and pushes it past the second set of cleaning brushes, and finally ejects it out of the rear end of the machine.

The relative spacing of the fingers upon the continuously moving chains is the feature which provides for the intermittent motion of the can, or its dwell, while in contact with the solder. This period of dwell in the solder is the equivalent of running the can through an elongated solder bath, but it will be seen that with the short bath the machine as a whole is much smaller and occupies less floor space than a machine of the older type. It is also evident that the quantity of solder in the bath may be very much less than that used in the old machine, so that the amount of heat required to maintain it in proper fused condition is correspondingly less. Other advantages are desired from the use of this machine which it is not considered necessary to refer to herein.

I claim:

1. In a can-soldering machine, the combination of a guideway along which the can travels, a solder bath located in said guideway and having a length substantially equal to that of the can to be acted upon, and means for imparting a continuous motion to the can along the guideway but allowing it to dwell at the solder bath.

2. In a can-soldering machine, the combination of a guideway along which the can travels, mechanism located in the guideway for applying a flux to the can seam, mechanism also located in the guideway for cleaning the soldered seam, a solder bath located in the guideway between the flux applying mechanism and the cleaning mechanism, said solder bath having a length in the direction of movement of the can substantially equal to the length of the can to be soldered, and means for feeding the can with a continuous motion along said guideway from the flux-applying mechanism to the cleaning mechanism with an intervening dwell at the solder bath, substantially as described.

3. In a can-soldering machine, the combination of a guide along which the can travels, a solder bath arranged in said guide and having a length in the direction of movement of the can, substantially equal to the length of the can, two continuously running belts adapted to successively move the can along the guide, one of the belts arranged to move the can into the solder bath while the other is arranged to move the can out of the solder bath after an appreciable interval of dwell.

4. In a can-soldering machine, the combination of a guide along which the can travels, two continuously moving belts each having fingers adapted to engage and move the can along the guide, the fingers being located upon the respective belts in such relative positions that a finger on one belt will not engage and move the can until the lapse of an appreciable time after a finger on the other belt has ceased to move the can, thereby affording a dwell of the can in its passage through the machine.

In witness whereof I subscribe my signature, in the presence of two witnesses.

LEO J. LEFFLER.

Witnesses:
 WALDO M. CHAPIN,
 HENRY J. KARR.

Copies of this patent may be obtained for five cents each, by addressing the "Commissioner of Patents, Washington, D. C."